Nov. 15, 1955   R. I. BARNES   2,724,029
CLOSE LIMIT THERMOSTATIC TEMPERATURE CONTROL
Filed May 28, 1953

Inventor:
Robert I. Barnes,
by Chardley Chittick
Attorney

United States Patent Office 2,724,029
Patented Nov. 15, 1955

2,724,029

CLOSE LIMIT THERMOSTATIC TEMPERATURE CONTROL

Robert I. Barnes, East Wareham, Mass.

Application May 28, 1953, Serial No. 357,961

10 Claims. (Cl. 200—138)

This invention relates to a thermostatic control in which the object to be accomplished by the structure is the opening and closing of a circuit as the temperature at the control may rise or fall.

Thermostatic controls that are now in common use, particularly those utilized to cause the starting and stopping of an oil burner or the opening and closing of the drafts of a coal furnace or the starting and stopping of any other type of automatically operated heating unit, are deficient in the following respects. If the thermostat calls for heat, the burner controlled thereby will run until the temperature at the thermostat has been satisfied, but because of the residual heat present in the radiators if the system be hot water or steam or in the plenum if the system be hot air, enough additional heat will be supplied to the room to cause the temperature to rise above that called for by the thermostat. This condition is known as overrun on the upside.

Thereafter, as the room cools, the temperature will fall to a point where the thermostat will again close, putting the burner in operation. However, due to the fact that heat from the burner started by the reclosing of the thermostat is not immediately available to the room to be heated, the room temperature will fall somewhat below the temperature at which the thermostat reclosed before the advancing heat checks the temperature drop and starts the temperature moving upward. This is called overrun on the downside.

These steps are repeated again and again as the heating cycle continues. The effect of this type of operation is that there is a temperature spread of as much as four degrees which is enough to be distinctly noticeable to a person in a room so controlled.

Accordingly, it is an object of the present invention to provide mechanism which will cause starting and stopping of a heat source at such times that the overruns will be considerably reduced, thus minimizing the temperature spread to a point where a person in a room under such control will be unaware that there is any change in the temperature.

A further object of the invention is to provide mechanism which will cause the heat source to commence operation before the room temperature has dropped to the desired temperature and will stop opeartion of the heat source before the room temperature has risen to the desired temperature. It will be understood, of course, that of necessity there must be a rise and fall of temperature to cause the thermostat to function, but it will be of such small degree that it will be unnoticeable.

A further object of the invention is the provision of a thermostatic control operating in the manner explained above which can be set at any required room temperature to cause operation of a heat source in the manner aforesaid.

These and other objects of the invention will become more apparent as the description proceeds with the aid of the accompanying drawings in which Fig. 1 is a front vertical view of the thermostat with its protecting cover removed.

Figure 3:
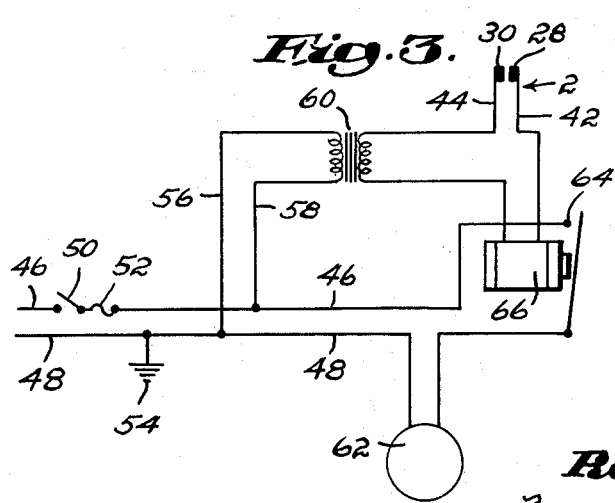
Fig. 3 is a typical wiring diagram with the thermostat incorporated therein.

The thermostatic control unit is generally referred to at 2 and its position in the wiring diagram shown in Fig. 3 is indicated. The unit is mounted on a panel 4 and comprises a pivoted control lever 6, the lower end of which has a pointer 8 which may be located with reference to required temperatures. In the present disclosure the setting of lever 6 may range from 55 to 85 degrees.

Lever 6 is pivoted on post 10 and suitably insulated from the panel 4. The upper end of lever 6 is bent at right angles and has secured thereto, by rivet 12, a thermostatic element 14 usually of bimetallic character so that its free end 16 will be caused to move to the right as the temperature falls and to the left as the temperature rises. The inner riveted end of element 14 is separated from the horizontal upper end of lever 6 by a suitable layer of insulation 18.

Affixed to the free end 16 of element 14 is a U-shaped clip 19 comprising a pair of upstanding spring fingers 20 and 21, which are so formed as to be urged toward each other. Between the fingers is the arcuate lower portion 22 of a lever or contact rotor 24. Arcuate portion 22 is so shaped in relation to the shifting movement of the upper end 16 of element 14 that the spring fingers 20 and 21 will always be in engagement therewith.

Contact rotor 24 is pivoted on post 26 which post is insulated in a suitable manner from panel 4. At the upper end of contact rotor 24 is a contact 28 movable through a small arc as the rotor 24 may be caused to pivot about post 26. Contact 28 is designed to make and break engagement with fixed contact 30 which latter contact also acts as a stop to limit movement of contact 28 to the left. A second stop 32 is provided which limits movement of contact 28 to the right.

Stops 30 and 32 are both adjustable by virtue of their screw threaded engagements with posts 34 and 36 respectively. Two other stops 38 and 40 threaded in posts 39 and 41 are provided to limit the lateral motion of end 16 of element 14 and such limitation of motion accordingly limits the lateral motion of spring fingers 20 and 21.

Connected with the contact rotor 24 is a wire 42 and connected with contact 30 is a wire 44. These two wires are shown in Fig. 3 in which the rest of the circuit is as follows. The normal house current power lines are indicated at 46 and 48 including a main switch 50, fuse 52, ground 54 and wires 56 and 58 leading to transformer 60. A motor 62 which causes actuation of the heat source, will be started upon the closing of switch 64. This switch is under the control of relay 66 which relay will be actuated upon the closing of contacts 28 and 30.

Figure 1:
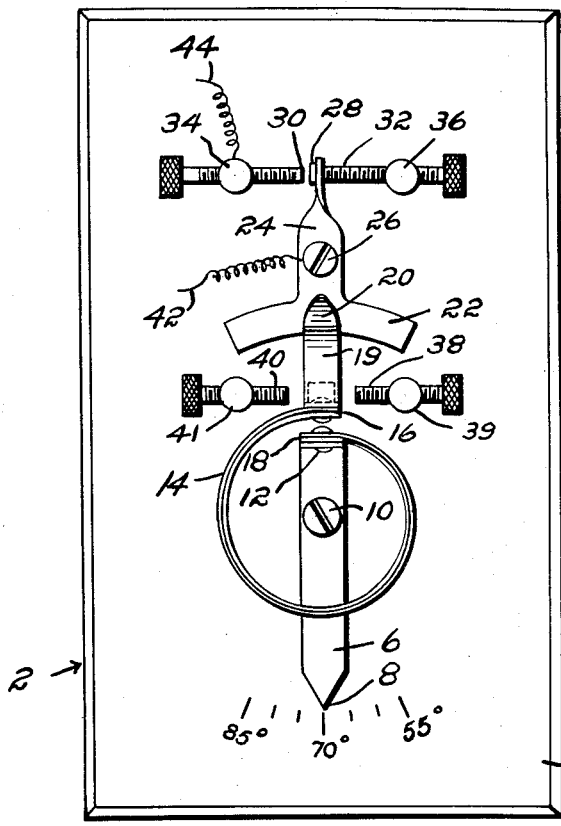
Figure 2:
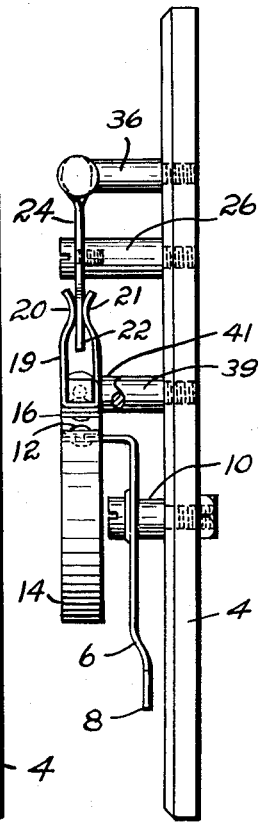
Fig. 2 is a side elevation looking from the right of Fig. 1.

The operation of the thermostat and heating system above described is as follows. For purposes of illustration, settings at specific temperatures will be given. Let us assume that the desired room temperature is 70°. Control lever 6 will be set at 70° as shown in Fig. 1. In this position the contacts 28 and 30 are shown as open so that motor 62 will not be in operation. Since contacts 28 and 30 are open and the lever 6 is set at 70°, it follows that the temperature at the thermostatic element 14 must be somewhat above 70°. As the temperature falls, the end 16 of element 14 will move to the right causing spring fingers 20 and 21 and arcuate portion 22 gripped thereby also to move to the right. Such movement of arcuate portion 22 will cause contact rotor 24 to be moved counterclockwise on post 26. As the space between contacts 28 and 30 is very small, a correspondingly small drop in temperature will produce enough movement of thermostatic element 14 to the right to close contacts 28 and 30, thus, setting the heat source 62 in operation. It will, however, require sometime before the heat now being created can be translated to heat in the room to cause a rise in temperature at the thermostatic element 14. Before this heat arrives at the element 14, there will be some further drop in temperature which will cause the end 16 to move a further distance to the right. However, since further movement of arcuate portion 22 is prevented as soon as contact 28 engages contact 30, it follows that the fingers of spring clip 19 will be caused to slide to the right along arcuate portion 22. Such sliding motion will continue so long as the temperature continues to fall.

Let us assume in the present instance that the temperature drops to 69° before the newly created heat arrives to check further cooling. Under such circumstances, it is believed apparent that when the temperature at element 14 commences to rise from the minimum of 69°, there will be at once a corresponding movement of the end 16 to the left. Such movement to the left occurs not at 70°, but at 69°. This movement to the left of end 16 will immediately commence clockwise rotation of contact rotor 24 which will break the circuit between contacts 28 and 30, thus immediately shutting off the heat source 62. The residual heat, however, that has now been placed in the radiators will cause a further rise in the temperature to bring the temperature at thermostatic element 14 up to at least 70° and a trifle thereabove.

Before the temperature at element 14 has reached the limit of its rise caused by the residual heat in the radiators, contact 28 will have come into engagement with stop 32 preventing further movement to the left of arcuate portion 22. The further rise in temperature, occurring after engagement of contact 28 and stop 32 will cause fingers 20 and 21 to slide somewhat to the left on arcuate portion 22. The result of this is that as soon as the temperature commences to fall, the spring fingers 20 and 21 and arcuate portion 22 begin their movement to the right causing contact 28 to start immediately in the direction of contact 30 so that the source of heat 62 will again be put into operation at a higher temperature than would have been the case had there not been the sliding action between the fingers 20 and 21 and arcuate portion 22 after movement of arcuate portion 22 was stopped by engagement of contact 28 and stop 32.

As soon as movable contact 28 engages fixed contact 30, movement of arcuate portion 22 stops and spring fingers 20 and 21 then slide slightly to the right until the newly produced heat becomes effective to check the fall of the temperature.

This cycle is then repeated again and again.

From the foregoing explanation of the operation of the device, it can be seen that the source of heat is put into operation while the temperature is falling, but above 70 degrees, and is taken out of operation when the temperature is rising, but below 70°. In other words, the heat requirements are anticipated in both directions so that the amount of overrun above and below 70° is appreciably minimized in comparison with the control afforded by conventional type thermostats now in general use.

The temperature control lever 6 can be set at any desired temperature within the limits of the unit and will function in exactly the same manner just described.

The stops 38 and 40 do not normally come into use. That is to say, any such movement of clip 20 as occurs in ordinary operation will not be sufficient to cause engagement with either of the stops.

It is my intention to cover all changes and modifications of the example of the invention herein chosen for purposes of the disclosure which do not constitute departures from the spirit and scope of the invention.

I claim:

1. A thermostatic temperature control unit comprising a thermostatic element having one end affixed to a control lever with the other end free to move in accord with temperature changes, a pivoted lever, connecting means on the free end of said thermostatic element for frictionally engaging said pivoted lever to cause pivotal movement thereof upon movement of the free end of said thermostatic element, said means connecting said pivoted lever and the free end of said thermostatic element being capable of shifting its position with respect to said pivoted lever when the pivoted lever is maintained stationary and a temperature change occurs thereafter, a contact on said lever for making and breaking contact with a fixed contact and means for holding the movement of said contact within a small arc of travel.

2. A thermostatic temperature control unit comprising a temperature setting control lever, a thermostatic element affixed to said lever with a free end portion adapted to move in accord with temperature changes and a pivoted lever having a contact at one end and an engageable surface at the other, said free end portion having means thereon that is in frictional engagement with said engageable surface.

3. A thermostatic temperature control unit comprising a thermostatic element fixed at one end and having a spring clip at its other end, a pivoted lever having a portion at one end which is engaged by said spring clip, a contact at the other end of said lever, means for holding the movement of said lever within a small arc whereby when movement of said lever in one direction under the influence of said thermostatic element is stopped, said spring clip may shift its position with respect to said portion upon further movement of said thermostatic element caused by a further change of temperature in the same direction.

4. A thermostatic control unit comprising a lever having a contact at one end and an engageable surface at the other end, means pivotally supporting said lever intermediate its ends, a thermostatic element having a free end portion provided with means on said free end portion frictionally engaging said engageable surface of said lever so that movement of said thermostatic element will cause movement of said lever within predetermined limits and permit shifting of said free end portion relative to said lever when said lever is restricted against movement and said thermostatic element is moved under the influence of ambient temperature.

5. A thermostatic control unit comprising a lever having a first portion provided with an electrical contact and a second portion of arcuate shape, means pivotally mounting said lever, stop means limiting movement of said lever within predetermined limits, a spiral thermostatic element having one end free to move in accordance with temperature changes, and a pair of spring fingers carried by said free end of said thermostatic element in slip friction engagement with said second portion of said lever.

6. The unit of claim 5 further including a control lever affixed to the other end of said thermostatic element.

7. A thermostatic control unit comprising a coiled thermostatic element having one end affixed to a control lever and a second end affixed to a spring clip, a pivoted lever having one end in slip-friction engagement with said spring clip, and means limiting movement of said lever within predetermined limits when actuated by said thermostatic element moving in response to a change in ambient temperature whereby additional movement in the same direction of said thermostatic element causes said spring clip to change its position relative to said lever.

8. A thermostatic control unit comprising a flat lever provided with an electrical contact and having an end portion of arcuate shape, means pivotally mounting said lever, stop means limiting movement of said lever within a small arc about said pivot means, a coiled thermostatic element having one end free to move in response to variations in ambient temperature, and connecting means fixedly secured to said free end of said thermostatic element in slip-friction engagement with said arcuate portion of said flat lever, whereby said connecting means causes said lever to be moved within the limits of said small arc by said thermostatic element in response to variations in ambient temperature and permits said thermostatic element to shift its position relative to said lever in response to temperature changes in the same direction occurring after on of said limits is reached.

9. A thermostatic control unit comprising a panel, a lever pivotally mounted on one side of said panel, said lever being rotatable in a plane parallel to the plane of said panel, stop means restricting movement of said lever within predetermined limits, a thermostatic element, means supporting said thermostatic element in parallel spaced relation to said panel on one side thereof whereby one end of said element is free to move in response to changes in ambient temperature, and spring clip means carried by said free end of said thermostatic element in slip-friction engagement with said lever, whereby said spring clip causes said lever to be moved within said predetermined limits by said thermostatic element moving in response to variations in ambient temperature and permits said thermostatic element to shift its position relative to said lever in response to temperature changes in the same direction occurring after one of said limits is reached.

10. A thermostatic control unit comprising a panel, a post secured to said panel, a lever rotatably mounted on said post, said lever being rotatable in a plane parallel to the plane of said panel, stop means restricting movement of said lever within predetermined limits, a thermostatic element coiled about an axis perpendicular to said panel, means carried by said panel supporting said thermostatic element in parallel spaced relation to said panel whereby one end of said element is free to move in response to changes in ambient temperatures, and connecting means carried by said free end of said coiled element in slip-friction engagement with said lever, whereby said connecting means causes said lever to be moved within said predetermined limits by said thermostatic element in response to variations in ambient temperature and permits said thermostatic element to shift its position relative to said lever in response to temperature changes in the same direction occurring after one of said limits is reached.

References Cited in the file of this patent

UNITED STATES PATENTS

| | | |
|---|---|---|
| 1,259,577 | Wolf | Mar. 19, 1918 |
| 1,826,488 | Zisch | Oct. 6, 1931 |
| 2,113,227 | Bokeeno | Apr. 5, 1938 |
| 2,152,843 | Fisher | Apr. 4, 1939 |
| 2,231,212 | Miller | Feb. 11, 1941 |
| 2,332,985 | Bullen | Oct. 26, 1943 |
| 2,558,610 | Diekhoff | June 26, 1951 |